United States Patent
Fleming

(10) Patent No.: US 8,281,514 B2
(45) Date of Patent: Oct. 9, 2012

(54) ORGANIC INSECT EXTERMINATION LAMP

(76) Inventor: Tom Fleming, San Diego, CA (US)

( * ) Notice: Subject to any disclaimer, the term of this patent is extended or adjusted under 35 U.S.C. 154(b) by 130 days.

(21) Appl. No.: 12/483,720

(22) Filed: Jun. 12, 2009

(65) Prior Publication Data

US 2009/0293341 A1 Dec. 3, 2009

Related U.S. Application Data

(63) Continuation-in-part of application No. 11/522,822, filed on Sep. 18, 2006, now abandoned.

(51) Int. Cl.
*A01M 13/00* (2006.01)
*A01M 1/20* (2006.01)

(52) U.S. Cl. ............ 43/129; 43/113; 43/125; 43/132.1; 239/34; 392/393; 392/403; 362/101

(58) Field of Classification Search .................... 43/113, 43/129, 125, 124, 132.1; 239/34, 53, 55, 239/56, 135, 136; 392/393, 386, 403; 362/92, 362/101, 643
See application file for complete search history.

(56) References Cited

U.S. PATENT DOCUMENTS

| | | | | |
|---|---|---|---|---|
| 692,075 A * | 1/1902 | Searle | .............................. | 43/129 |
| 1,230,342 A * | 6/1917 | Thornberg | ..................... | 392/393 |
| 1,357,824 A * | 11/1920 | Rhodes et al. | .................. | 362/92 |
| 1,403,548 A * | 1/1922 | Gudeman | ...................... | 392/393 |
| 1,732,707 A * | 10/1929 | Winsboro | ...................... | 392/393 |
| 1,913,571 A * | 6/1933 | Stromgsen | ....................... | 43/129 |
| 1,934,887 A * | 11/1933 | Robinson | ...................... | 392/393 |
| 1,960,098 A * | 5/1934 | Breitenbach | .................. | 392/403 |
| 1,966,738 A * | 7/1934 | Seewagen | ...................... | 392/393 |
| 1,992,684 A * | 2/1935 | Weinberger | .................... | 422/125 |
| 2,045,903 A * | 6/1936 | Fortin | ........................... | 392/393 |
| 2,081,768 A * | 5/1937 | Ritter | .............................. | 43/129 |
| 2,124,543 A * | 7/1938 | Clyne | ........................... | 392/393 |
| 2,143,246 A * | 1/1939 | McGary | ........................ | 392/393 |
| 2,152,466 A * | 3/1939 | Clyne | ........................... | 392/393 |
| 2,177,337 A * | 10/1939 | Stein | .............................. | 362/101 |
| 2,207,889 A * | 7/1940 | Kingman | ...................... | 392/393 |
| 2,220,583 A * | 11/1940 | Hopcraft et al. | .............. | 392/393 |
| 2,293,235 A * | 8/1942 | Zahner | .......................... | 392/403 |
| 2,372,371 A * | 3/1945 | Eisner | .......................... | 392/393 |
| 2,435,756 A * | 2/1948 | Schlesinger | .................... | 239/34 |
| 2,465,762 A * | 3/1949 | Supplee | ......................... | 362/92 |
| 2,468,164 A * | 4/1949 | Brewster | ....................... | 392/393 |
| 2,501,496 A * | 3/1950 | Cartwright | ....................... | 422/4 |
| 2,532,181 A * | 11/1950 | Moore | ........................... | 362/101 |
| 2,565,352 A * | 8/1951 | Champney et al. | ............. | 43/129 |

(Continued)

FOREIGN PATENT DOCUMENTS

DE 2500078 A1 * 12/1975

(Continued)

*Primary Examiner* — Darren W Ark
(74) *Attorney, Agent, or Firm* — Biotech Beach Law Group PC

(57) ABSTRACT

Disclosed embodiments provide a method and apparatus for an organic insect extermination lamp, which continuously kills mosquitoes and other biting insects without the use of hazardous chemicals, pesticides or electrocution. The organic insect extermination lamp includes a housing; a fixture including a power source and an LED light source for attracting mosquitoes and other biting insects without emitting substantial heat; at least one covered reservoir having a closable cap for holding a natural exterminating substance; and a natural exterminating substance, wherein the natural exterminating substance decomposes to produce natural exterminating fumes for killing mosquitoes and other biting insects.

9 Claims, 10 Drawing Sheets

U.S. PATENT DOCUMENTS

| | | | | |
|---|---|---|---|---|
| 2,591,818 A * | 4/1952 | Huff | | 422/125 |
| 2,606,095 A * | 8/1952 | Bateman et al. | | 43/125 |
| 2,663,866 A * | 12/1953 | Simpson | | 362/101 |
| 2,694,771 A * | 11/1954 | Cox | | 392/393 |
| 2,696,548 A * | 12/1954 | Bencetti | | 392/403 |
| 2,714,649 A * | 8/1955 | Critzer | | 392/393 |
| 2,733,333 A * | 1/1956 | Peters | | 392/393 |
| 2,741,813 A * | 4/1956 | Rubin | | 392/393 |
| 2,742,342 A * | 4/1956 | Dew et al. | | 43/129 |
| 2,745,947 A * | 5/1956 | Sansous | | 362/101 |
| 2,761,055 A * | 8/1956 | Ike | | 43/125 |
| 2,799,116 A * | 7/1957 | Leftwich | | 43/113 |
| 2,822,459 A * | 2/1958 | Kamin | | 392/403 |
| 2,824,208 A * | 2/1958 | Bauer | | 392/393 |
| 2,882,640 A * | 4/1959 | Kopecky | | 43/129 |
| 2,918,750 A * | 12/1959 | Blatt | | 43/125 |
| 2,942,090 A * | 6/1960 | Diehl | | 392/393 |
| 3,030,267 A * | 4/1962 | Margot | | 43/124 |
| 3,055,803 A * | 9/1962 | Cantrel et al. | | 43/124 |
| 3,080,624 A * | 3/1963 | Weber, III | | 392/393 |
| 3,248,530 A * | 4/1966 | Wollaston | | 392/393 |
| 3,279,118 A * | 10/1966 | Allen | | 43/129 |
| 3,288,556 A * | 11/1966 | Weber, III | | 392/403 |
| 3,374,344 A * | 3/1968 | Rudolph et al. | | 362/101 |
| 3,421,841 A * | 1/1969 | Wittwer | | 43/129 |
| 3,443,083 A * | 5/1969 | Curran | | 362/101 |
| 3,780,260 A * | 12/1973 | Elsner | | 392/393 |
| 3,878,386 A * | 4/1975 | Douglas | | 362/101 |
| 3,923,458 A * | 12/1975 | Moran | | 239/136 |
| 3,948,445 A * | 4/1976 | Andeweg | | 392/393 |
| 3,959,642 A * | 5/1976 | Turro | | 362/92 |
| 4,009,384 A * | 2/1977 | Holland | | 239/56 |
| 4,055,233 A | 10/1977 | Huntress | | |
| 4,074,111 A * | 2/1978 | Hunter | | 392/393 |
| 4,166,087 A * | 8/1979 | Cline et al. | | 239/56 |
| 4,184,099 A * | 1/1980 | Lindauer et al. | | 392/393 |
| 4,191,524 A * | 3/1980 | Thorn | | 239/135 |
| 4,214,146 A * | 7/1980 | Schimanski | | 43/129 |
| 4,216,176 A * | 8/1980 | Tanaka | | 392/393 |
| 4,226,829 A * | 10/1980 | Mike | | 43/129 |
| 4,228,124 A * | 10/1980 | Kashihara et al. | | 43/129 |
| 4,346,059 A * | 8/1982 | Spector | | 239/56 |
| 4,493,011 A * | 1/1985 | Spector | | 362/101 |
| 4,544,592 A * | 10/1985 | Spector | | 392/393 |
| 4,579,717 A * | 4/1986 | Gyulay | | 392/393 |
| 4,627,963 A * | 12/1986 | Olson | | 392/393 |
| 4,647,428 A * | 3/1987 | Gyulay | | 392/393 |
| 4,647,433 A * | 3/1987 | Spector | | 392/393 |
| 4,853,517 A * | 8/1989 | Bowen et al. | | 392/392 |
| 4,867,149 A | 9/1989 | Falco | | |
| 4,965,490 A * | 10/1990 | Ratner | | 392/386 |
| 5,333,622 A | 8/1994 | Casali | | |
| 5,335,446 A * | 8/1994 | Shigetoyo | | 43/129 |
| 5,429,817 A * | 7/1995 | McKenzie | | 424/754 |
| 5,566,502 A * | 10/1996 | Shigetoyo | | 43/129 |
| 5,644,866 A * | 7/1997 | Katsuda et al. | | 43/129 |
| 5,647,164 A * | 7/1997 | Yates | | 43/113 |
| 5,711,953 A * | 1/1998 | Bassett | | 424/405 |
| 5,728,376 A * | 3/1998 | Attygalle et al. | | 43/132.1 |
| 5,885,600 A * | 3/1999 | Blum et al. | | 424/405 |
| 5,957,136 A | 9/1999 | Magidson et al. | | |
| 5,988,313 A | 11/1999 | Hakansson | | |
| 6,033,212 A * | 3/2000 | Bonnema et al. | | 43/129 |
| 6,035,098 A * | 3/2000 | Chipalkatti et al. | | 392/393 |
| 6,241,042 B1 | 6/2001 | Falco | | |
| 6,277,823 B1 * | 8/2001 | Kramer et al. | | 43/132.1 |
| 6,293,044 B1 * | 9/2001 | Feng | | 43/129 |
| 6,482,365 B1 * | 11/2002 | Soller | | 43/125 |
| 6,524,605 B1 * | 2/2003 | Coats et al. | | 43/132.1 |
| 6,568,394 B2 | 5/2003 | Falco | | |
| D485,930 S | 1/2004 | Chen | | |
| 6,691,454 B1 * | 2/2004 | Conroy | | 43/132.1 |
| 6,820,717 B2 | 11/2004 | Fleming et al. | | |
| D500,159 S | 12/2004 | Chen | | |
| 6,854,208 B1 * | 2/2005 | Chuang et al. | | 43/113 |
| D503,008 S | 3/2005 | Chen | | |
| D506,019 S | 6/2005 | Chen | | |
| 7,168,630 B1 * | 1/2007 | Ketcha et al. | | 43/125 |
| D538,381 S | 3/2007 | Chen | | |
| 7,215,878 B2 * | 5/2007 | Neumann et al. | | 392/395 |
| 7,314,047 B2 | 1/2008 | Falco | | |
| D567,984 S | 4/2008 | Chen | | |
| D596,695 S | 7/2009 | Chen | | |
| D602,116 S | 10/2009 | Chen | | |
| D612,902 S | 3/2010 | Fleming | | |
| 7,712,249 B1 * | 5/2010 | Modlin et al. | | 43/129 |
| 7,824,627 B2 * | 11/2010 | Michaels et al. | | 239/102.2 |
| 7,946,748 B2 * | 5/2011 | Shen | | 43/129 |
| 7,988,984 B2 * | 8/2011 | Hockaday | | 43/113 |
| 8,137,630 B2 * | 3/2012 | Jorgensen | | 239/136 |
| 2003/0049025 A1 * | 3/2003 | Neumann et al. | | 43/125 |
| 2004/0163653 A1 | 8/2004 | Fleming | | |
| 2004/0163882 A1 | 8/2004 | Fleming et al. | | |
| 2006/0091570 A1 * | 5/2006 | Reece | | 43/125 |
| 2006/0137241 A1 * | 6/2006 | Yamasaki et al. | | 43/125 |
| 2006/0177080 A1 | 8/2006 | Smith | | |
| 2006/0242891 A1 * | 11/2006 | Marshall | | 43/132.1 |
| 2006/0260183 A1 * | 11/2006 | Hockaday | | 43/129 |
| 2006/0272649 A1 | 12/2006 | Fleming | | |
| 2007/0221232 A1 | 9/2007 | Jenkins | | |
| 2008/0011308 A1 | 1/2008 | Fleming | | |
| 2008/0178518 A1 * | 7/2008 | Reece | | 43/125 |
| 2009/0007482 A1 * | 1/2009 | Sewzyk et al. | | 43/129 |
| 2010/0224697 A1 * | 9/2010 | Modlin et al. | | 43/132.1 |

FOREIGN PATENT DOCUMENTS

| | | | |
|---|---|---|---|
| EP | 1281406 A1 * | 2/2003 | |
| EP | 1321036 A2 * | 6/2003 | |
| EP | 1424005 A1 * | 6/2004 | |
| FR | 2529439 A1 * | 1/1984 | |
| FR | 2573284 A1 * | 5/1986 | |
| FR | 2672185 A1 * | 8/1992 | |
| JP | 10162611 A * | 6/1998 | |
| JP | 2000038309 A * | 2/2000 | |
| JP | 2003125691 A * | 5/2003 | |
| JP | 2003199474 A * | 7/2003 | |
| JP | 2004178857 A * | 6/2004 | |
| JP | 2004357665 A * | 12/2004 | |
| JP | 2009046433 A * | 3/2009 | |
| WO | WO-2004/071540 | 8/2004 | |
| WO | WO 2004071540 A1 * | 8/2004 | |

* cited by examiner

US 8,281,514 B2

ORGANIC INSECT EXTERMINATION LAMP

CROSS-REFERENCE TO RELATED APPLICATIONS

This application is a continuation-in-part of U.S. patent application Ser. No. 11/522,822 filed on Sep. 18, 2006 which is incorporated herein by reference in its entirety.

FIELD OF THE INVENTION

The present invention relates generally to insect extermination devices, and more specifically to an organic extermination lamp for exterminating mosquitoes and other biting insects using organic compounds.

BACKGROUND OF THE INVENTION

Every year over a million people worldwide die from mosquito-born diseases such as Malaria, Dengue, Encephalitis, and West Nile Virus. Artificial light sources exacerbate the spread of disease by attracting mosquitoes to areas of human activity. Chemical insecticides used in these areas have further cumulative detrimental health effects and damaging environmental repercussions. Merely repelling, rather than exterminating mosquitoes and other infectious biting insects, does not prevent local migration to adjacent areas.

Known methods for repelling or destroying mosquitoes and other biting insects are unreliable and produce unpleasant effects. Netting and screens inhibit ventilation and concentrate insects near light sources. Ultraviolet electrocution devices produce disturbing sounds and smells while upsetting the eco-system by killing more beneficial insects than mosquitoes. Traps are largely ineffective because only a small percentage of biting insects are successfully maneuvered into such devices. Chemical insecticides are only marginally effective, poison the environment and often result in progressively worsening human health.

Traps and ultraviolet zappers are not only ineffective but often do more harm than good, because they attract mosquitoes without killing them. Ultraviolet light aids mosquitoes in finding water to lay their eggs by polarizing light reflected off the surface of water. Each night, a typical ultra violet zapper kills approximately 3,000 beneficial insects such as moths and butterflies, but only a few mosquitoes. Less than one fourth of one percent of insects killed by traps and zappers are biting insects, and nearly 50% have been found to be beneficial non-biting aquatic insects such as caddis flies and midges that feed fish, frogs, birds and bats. Another 14 percent have been found to be insects that actually attack pests, including wasps, ground beetles and ladybugs.

Thus, there is a need in the art for a pleasant and effective method of exterminating mosquitoes and other biting insects using only natural organic compounds having no adverse effects on human health or the environment.

SUMMARY OF THE INVENTION

Embodiments disclosed herein address the above-stated needs by providing an organic insect extermination lamp, which continuously kills mosquitoes and other biting insects without the use of chemicals or pesticides that pose a significant health risk to humans or electrocution. The present organic insect extermination lamp has no detrimental effects on human health or the environment.

Accordingly, in one aspect, an insect extermination lamp comprising a fixture having a power supply and a light source for attracting mosquitoes and other biting insects and at least one container for holding a natural exterminating substance, wherein the natural exterminating substance produces natural exterminating vapors for killing the mosquitoes and other biting insects, is disclosed.

In some embodiments, the insect extermination lamp includes a housing; a fixture including a power source and a light source with reduced heat or thermal emissions; a reservoir for holding a natural exterminating substance; and a natural exterminating substance that decomposes to produce natural exterminating fumes for killing mosquitoes or biting insects. In some embodiments the fixture includes a photovoltaic cell and an LED light source.

In related embodiments a method of exterminating biting insects within an environmental perimeter is provided, which includes placing at least one organic insect exterminating lamp in a position approximately centered within the perimeter where insect control is desired; opening the closable cap of the reservoir; and allowing the insect exterminating gases produced by the decomposition of the natural exterminating substance to diffuse from the lamp.

BRIEF DESCRIPTION OF THE DRAWINGS

Those of skill in the art will understand that the drawings, described below, are for illustrative purposes only. The drawings are not intended to limit the scope of the present teachings in any way.

DETAILED DESCRIPTION OF THE INVENTION

Figure 1:
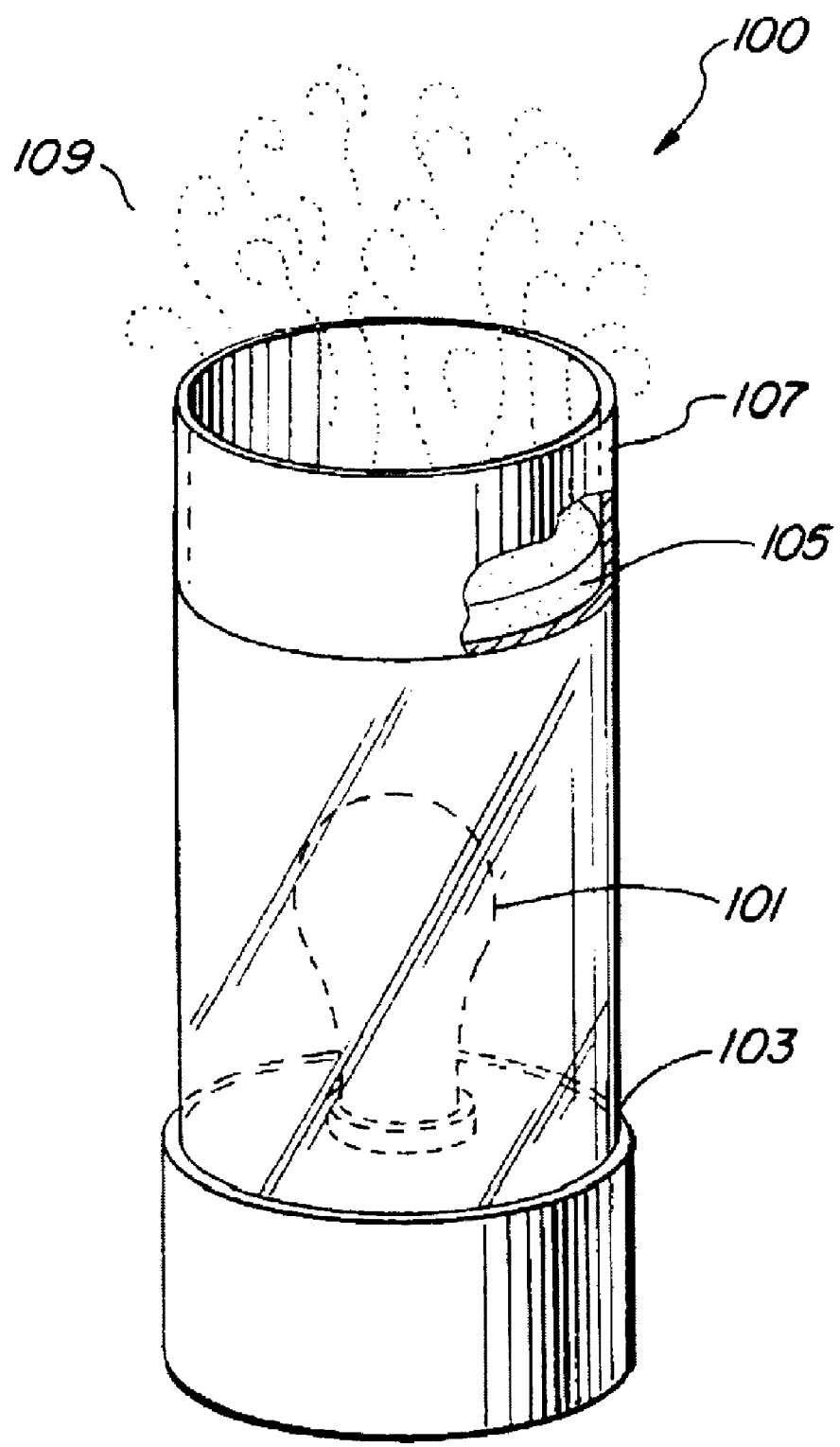
FIG. 1 illustrates an alternating current powered open container organic insect extermination lamp in accordance with one embodiment of the present invention.

The word "organic" is used herein to mean "of, relating to, or derived from living organisms."

The word "natural" is used herein to mean "as being in accordance with or determined by nature: having or constituting a classification based on features existing in nature."

The words "natural" and "organic" are used herein to mean having no detrimental effects on human health or the environment in any quantity.

The words "mosquitoes" and "other biting insects" are used herein to mean mosquitoes, gnats, no-seeums and/or any other species of insect pests known to bite mammals.

The words "biphasic" or "biphasic system" are used herein to mean a system that includes two distinct phases, such as two phases separated by densities. A "biphasic system" mean include an upper phase and a lower phase, wherein the upper phase is less dense than the lower phase. A "biphasic system" can permit escape of emitted gasses from a lower phase while substantially preventing direct contact with or exposure to the source of emission itself.

The term "without emitting substantial heat" or "reduced heat or thermal emissions" as used herein refers to a light source that is cool to the touch. A light source that does not emit substantial heat does not cause first, second or third degree burns if touched. An exemplary light source that operates "without emitting substantial heat" is a light emitting diode (LED).

The word "exemplary" is used exclusively herein to mean "serving as an example, instance, or illustration." Any embodiment described herein as "exemplary" is not necessarily to be construed as preferred or advantageous over other embodiments.

Through centuries of evolution, mosquitoes and other biting insects have developed a variety of sensors for detecting food. Adult biting female mosquitoes employ a sophisticated array of sensors including those for detection of light, heat, and chemistry. The compound eyes of mosquitoes, in addition to being superbly adapted to detect movement, also detect light sources very effectively, especially at night when ambient light is decreased. Mosquitoes are attracted to light as well as heat sources, and they will respond to these stimuli from great distances. A mosquito's chemistry sensors can detect moisture and carbon dioxide expelled in human breath. Mosquitoes are also attracted to a plethora of species-specific scents.

Embodiments of the presently disclosed organic insect extermination lamp attract mosquitoes and other biting insects by natural stimulation of their light, heat, chemical sensors or a combination thereof. Accordingly, biting insects may be selectively targeted and exterminated with organic compounds produced by the presently disclosed lamps. The organic insect extermination lamp is a continuous, all natural, quiet killing system, which contains no pesticides or synthetic chemicals harmful to mammals, as well as no propane. The disclosed embodiments of organic extermination lamps can provide pleasant night time lighting while allowing use of outdoor, decks, patios, porches, backyards and camping areas free from biting insects. In preferred embodiments extermination occurs without emitting substantial heat from the light source.

Embodiments of organic extermination lamps described in FIGS. 1 through 11 comprise interchangeable power supply, light, container, and means for distributing organic vapors. Various combinations of components can be used.

In certain embodiments of the invention, the lamp's power supply can be for example, alternating current (AC), direct current (DC), batteries, photovoltaic cells, or a combination thereof, or the like.

In embodiments using AC power, the AC power can be, for example, provided by an electrical wire connected to a power grid, or connected to a generator, or the like.

In embodiments using batteries, the batteries can be, for example, primary cells, such as, for example, alkaline batteries, aluminium batteries, atomic batteries, bunsen cells, chromic acid cells, clark cells, daniell cells, germ batteries, leclanché cells, lemon batteries, lithium batteries, mercury batteries, molten salt batteries, optoelectric nuclear batteries, organic radical batteries, oxyride batteries, paper batteries, silver-oxide batteries, voltaic piles, water-activated batteries, weston cells, zinc-air batteries, zinc-carbon batteries, or combinations thereof, or the like.

In embodiments using batteries, the batteries can be, for example, secondary cells, such as, for example, lead-acid batteries, lithium-ion batteries, lithium ion polymer batteries, lithium-sulfur batteries, molten salt batteries, nickel-cadmium batteries, nickel-iron batteries, nickel hydrogen batteries, nickel metal hydride batteries, nickel-zinc batteries, rechargeable alkaline batteries, sodium-sulfur batteries, super iron batteries, super charge ion batteries, vanadium redox batteries, zinc-bromine flow batteries, or combinations thereof, or the like.

Some embodiments of the invention utilize at least one photovoltaic cell. A photovoltaic (or "solar") cell is a device that converts sunlight directly into electricity by the photovoltaic effect. Often the term solar cell is reserved for devices intended specifically to capture energy from sunlight, while the term photovoltaic cell is used when the light source is unspecified. Solar cells utilize a light absorbing material within the cell structure to absorb photons and generate electrons via the photovoltaic effect. The materials used in solar cells preferentially absorb the wavelengths of solar light that reach the earth's surface. Light absorbing materials can often be used in multiple physical configurations to take advantage of different light absorption and charge separation mechanisms.

Photons in sunlight strike the solar panel and are absorbed by semi-conducting materials, such as silicon. This energy causes electrons to be freed from their atoms, allowing them to flow through the material and produce electricity. When a photon is absorbed, its energy is given to an electron in the crystal lattice. Usually this electron is in the valence band, tightly bound between neighboring atoms, and hence unable to move far. The energy contributed by the photon "excites" it into the conduction band, where it is free to move around within the semiconductor. The covalent bond that the electron was previously a part of now has one fewer electron—this is known as a "hole." The presence of a missing covalent bond allows the bonded electrons of neighboring atoms to move into the "hole," leaving another hole behind, and in this way a hole can move through the lattice. Due to the special composition of solar cells, the electrons are only allowed to move in a single direction. An array of solar cells converts solar energy into a usable amount of DC electricity.

In certain embodiments of the invention, at least one photovoltaic cell can be used to recharge at least one battery that powers the lamp. Accordingly, batteries may be charged during daylight hours or in the presence of a charging light source thereby extending the life of nighttime extermination or during decreased light hours. In certain embodiments, photovoltaic cells of various shapes, for example, circular, square, rectangular, triangular, or the like, can be used. In certain embodiments, photovoltaic cells of any suitable shape can be used.

In certain embodiments, the lamp's light source can be, for example, an incandescent bulb, a fluorescent bulb such as a compact fluorescent lamp (CFL), a Light Emitting Diode (LED), an ultraviolet (UV) source, an open flame, or the like. In certain embodiments, the light source has reduced thermal emissions and thus emits a very small amount of thermal energy, if at all. In certain embodiments, the light source is placed so as to provide no heating effect on the organic material, such as, for example, by distancing the light source from the organic material, or shielding the light source from the organic material, or the like. Reduced thermal emissions further increase the safety of the device by eliminating the likelihood of burns.

The incandescent light bulb is a source of electric light that works by incandescence (a general term for heat-driven light emissions). An electric current passes through a thin filament, heating it until it produces light. The enclosing glass bulb prevents oxygen from reaching the hot filament, which otherwise would be destroyed rapidly by oxidation. Incandescent bulbs are also sometimes called electric lamps, a term also applied to the original arc lamps.

Incandescent bulbs are made in a wide range of sizes and voltages, from 1.5 volts to about 300 volts. They require no external regulating equipment and have a low manufacturing cost, and work well on either alternating current or direct current. As a result, the incandescent lamp is widely used in household and commercial lighting, for portable lighting, such as table lamps, some car headlamps and electric flashlights, and for decorative and advertising lighting.

A CFL is a type of fluorescent lamp. Many CFLs are designed to replace an incandescent lamp and can fit into most existing light fixtures formerly used for incandescents. Compared to general service incandescent lamps giving the same amount of visible light, CFLs generally use less power, have a longer rated life, but a higher purchase price. Like all fluorescent lamps, CFLs contain mercury, which complicates their disposal.

CFLs radiate a different light spectrum from that of incandescent lamps. Improved phosphor formulations have improved the subjective color of the light emitted by CFLs such that the best 'soft white' CFLs are subjectively similar in color to standard incandescent lamps.

An LED is an electronic light source. The LED was invented in Russia in the 1920's, and introduced in the US as a practical electronic component in 1962. Early LED's emitted low-intensity red light, but modern LEDs are available across the visible, ultraviolet and infra red wavelengths, with very high brightness. LEDs are based on the semiconductor diode. When the diode is forward biased (switched on), electrons are able to recombine with holes and energy is released in the form of light. This effect is called electroluminescence and the color of the light is determined by the energy gap of the semiconductor. The LED is usually small in area with integrated optical components to shape its radiation pattern and assist in reflection.

LEDs present many advantages over traditional light sources including lower energy consumption, longer lifetime, improved robustness, smaller size and faster switching.

LED's are highly monochromatic, emitting a pure color in a narrow frequency range. The color emitted from an LED is identified by peak wavelength (lpk) and measured in nanometers (nm). Peak wavelength is a function of the LED chip material. Although process variations are ±10 nm, the 565 to 600 nm wavelength spectral region is where the sensitivity level of the human eye is highest. Therefore, it is easier to perceive color variations in yellow and amber LEDs than other colors. LEDs are made from gallium-based crystals that contain one or more additional materials such as phosphorous to produce a distinct color. Different LED chip technologies emit light in specific regions of the visible light spectrum and produce different intensity levels.

Embodiments of the invention utilize LEDs as an insect attractant light source. In certain embodiments, the LED's are placed so as to provide no heating effect on the organic insect exterminating material, such as, for example, by distancing the LED from the organic material, or shielding the LED from the organic material, or allowing air flow between the LED and the organic material, or a combination thereof, or the like.

UV light is electromagnetic radiation with a wavelength shorter than that of visible light, but longer than x-rays, in the range 10 nm to 400 nm, and energies from 3 eV to 124 eV. It is so named because the spectrum consists of electromagnetic waves with frequencies higher than those that humans identify as the color violet. UV light is found in sunlight and is emitted by electric arcs and specialized lights such as black lights. As an ionizing radiation it can cause chemical reactions, and causes many substances to glow or fluoresce.

Embodiments of the invention can include a receptacle, well, container, or reservoir in which to store the organic material. The container can be made of any suitable material, such as, for example, metals, plastics, or the like. In preferred embodiments, the reservoir reversibly opens and closes to permit the user to selectively operate the device and to decrease likelihood of spilling during transport between extermination locations.

Embodiments of the invention can utilize a housing to contain the elements of the device as well as physically connect the lamp and the reservoir. The housing can be made of any suitable material, such as, for example, metals, plastics, or the like.

In embodiments utilizing metals, the metals can be, for example, Lithium, Sodium, Potassium, Rubidium, Cesium, Francium, Beryllium, Magnesium, Calcium, Strontium, Barium, Radium, Aluminum, Gallium, Indium, Tin, Thallium, Lead, Bismuth, Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Lanthanum, Hafnium, Tantalum, Tungsten. Rhenium, Osmium, Iridium, Platinum, Gold, Mercury, Actinium, Rutherfordium, Dubnium, Seaborgium, Bohrium, Hassium, Meitnerium, Darmstadtium, Roentgenium, Cerium, Praseodymium, Neodymium, Promethium, Samarium, Europium, Gadolinium, Terbium, Dysprosium, Holmium, Erbium, Thulium, Ytterbium, Lutetium, Thorium, Protactinium, Uranium, Neptunium, Plutonium, Americium, Curium, Berkelium Californium, Einsteinium, Fermium, Mendelevium, Nobelium, Lawrencium, combinations thereof, alloys thereof, and the like. In certain embodiments, alloys used can include, for example, steel, or the like.

In embodiments that include plastic materials, the plastics can be, for example, thermoplastics, such as, for example, acrylonitrile butadiene styrene plastics (ABS), acetals, acrylic (Perspex), acrylo-nitrile (nylon), cellulosics, fluoroplastics, high-density polyethylene (HDPE), low-density polyethylene (LDPE), Noryl, polyarylates, polyarylsulfones, polybutylenes, polybutylene terepthalate (PBT), polycarbonates, polyesters, polyetherimides, polyetherketones, polyethylene (polythene), polypropylene, polyallomers, polyethylene terephalate, polyimides, polyamide-imides, poly vinyl acetate (PVA), poly vinyl chloride (PVC), polystyrene, polysulfones, Styrene, ABS PTFE (Teflon), and the like.

Likewise, the plastic materials can be, for example, thermosets, such as, for example, alkyd polyesters, allyls, bakelite, epoxy, melamine, phenolics, polybutadienes, polyester, polyurethane, silicones, ureas, and the like. Likewise, the plastic materials can include bioplastics. Bioplastics are a form of plastics derived from renewable biomass sources, such as vegetable oil, corn starch, pea starch, or microbiota, rather than traditional plastics that are often derived from petroleum. Types of bioplastics suitable for use with embodiments of the invention include, for example, polylactide acid (PLA) plastics, poly-3-hydroxybutyrate (PHB), polyamide 11 (PA 11), bio-derived polyethylene, and the like.

In certain embodiments, distributing the organic vapors can be accomplished via any suitable means, such as, for example, evaporation, decomposition, or the like.

Evaporation is a type of phase transition by which molecules in a liquid state spontaneously become gaseous. For molecules of a liquid to evaporate, they must be located near the phase interface, such as that between a liquid and a gas, and have sufficient kinetic energy to overcome liquid-phase intermolecular forces. Typically, only a small proportion of the molecules in a liquid meet these criteria, thus the rate of evaporation is limited.

Because the kinetic energy of a molecule is proportional to its temperature, evaporation proceeds more quickly at higher temperatures. As faster-moving molecules escape, the remaining molecules have lower average kinetic energy, and the temperature of the liquid thus decreases, a phenomenon called evaporative cooling. In certain embodiments of the invention, the organic vapors can be distributed via an evaporative process. Further, certain embodiments can include heat-producing elements to accelerate the evaporative process. Alternatively, in certain embodiments, the process occurs as a result of ambient heat only, with no heat energy added by the device itself.

Decomposition refers to the process by which the tissue of dead organisms breaks down into simpler forms of matter. This process is essential for the growth and development of living organisms, as it recycles chemical constituents and creates physical space in the biome. The tissue of living organisms begins to decompose shortly after death. The first stage of decomposition is limited to the production of vapors. The second stage is characterized by the formation of liquid materials; flesh or plant matter beginning to decompose. The science which studies such decomposition generally is called taphonomy from the Greek word taphos, meaning grave.

Decomposition is caused by two factors: autolysis, the breaking down of tissues by internal chemicals and enzymes; and putrefaction, the breakdown of tissues by bacteria. These processes release gases.

The speed at which decomposition occurs varies greatly. Factors such as temperature, humidity, and the season of death all influence the speed of decomposition. In certain embodiments of the invention, the organic vapors can be distributed via a decomposition process whereby the decomposing organic material releases gases. Further, certain embodiments can include heat-producing elements to accelerate the decomposition process. Alternatively, in certain embodiments, the process occurs as a result of ambient heat only, with no heat energy added by the device itself. In some embodiments, the organic material can be covered with a liquid, such that the organic material is not exposed to atmospheric gas.

In certain embodiments, the natural exterminating substance can comprise the denser component of a biphasic system wherein the less-dense phase prevents the natural exterminating substance from contacting the atmosphere. In certain embodiments, the less-dense phase can be, for example, cooking oil, or the like, or any suitable liquid material that prevents the natural exterminating substance from contacting the atmosphere.

Likewise, in certain embodiments the natural exterminating substance can be a solid material. In embodiments utilizing a solid natural exterminating substance, the substance can be covered in a material to prevent contact with the atmosphere. In certain embodiments, the covering material can be, for example, cooking oil, or the like, or any suitable liquid material that prevents the natural exterminating substance from contacting the atmosphere.

FIG. 1 illustrates an exemplary embodiment of an AC powered open container organic insect extermination lamp. Lamp 100 comprises light and heat source 101 housed in fixture 103 for vaporizing natural exterminating substance 105 from container 107. Optionally, a second bottom container (not shown) may also hold additional natural exterminating substance.

Light and heat source 101 can comprise an AC powered incandescent bulb, fluorescent bulb, ultraviolet bulb or LED. Mosquitoes and other biting insects are attracted to light and heat source 101 from substantial distances. In addition to providing pleasant nighttime lighting and attracting mosquitoes, light and heat source 101 heats natural exterminating substance 105 held by container 107 to an optimal evaporative temperature. Light and heat source 101 is selected to generate adequate heat for attracting mosquitoes without over heating natural exterminating substance 105 (i.e. cooking the substance rather than producing a slow evaporation of substance 105 properties lethal to mosquitoes).

In one embodiment, a 25 Watt incandescent globe bulb generates the optimal amount of heat to aid evaporation. During the day, in spring and summer, the ambient temperature will provide evaporation. At night, the heat by product of the 25 Watt bulb produces optimal heat to assist evaporation, providing continuous extermination. In another embodiment, an earth friendly 13 Watt Compact-Fluorescent bulb 101 generates enough heat to warm natural exterminating substance 105 using less energy and lasting approximately ten times longer than an incandescent bulb. 13 Watt Compact-Fluorescent bulb 101 safely heats natural exterminating substance 105 to optimal temperatures between 106.6 F and 109.9 F while providing the equivalent of 60 Watts of incandescent lighting.

Decomposition of natural plants begins shortly after being picked. During the first stage of natural plant decomposition, vapors are given off. Plants containing natural sulfides produce sulfide vapors. Natural exterminating substance 105 comprises a suspension of organic compound in an evaporable liquid. In one embodiment, natural exterminating substance 105 is a suspension of Allyl Sulfide in oil, which produces natural sulfide vapors 109 when evaporated. Allyl Sulfide is a natural sulfide found in plants such as garlic, onions and Mahogany trees. Allyl Sulfides are unstable natural sulfides, which break down in the heating process to produce evaporative fumes 109 that paralyze the nervous system of mosquitoes, gnats, and other biting insects resulting in death, in quantities as small as a few parts per million. Thus, even a negligible concentration of evaporative Allyl Sulfide vapor 109 kills mosquitoes without harm to human health or the environment.

In an exemplary embodiment, a suspension of garlic oil concentrate in cooking oil kills mosquitoes twenty four hours a day for three weeks or more. Cooking oil, such as canola oil, is a high temperature medium, which does not burn off at the low temperatures generated by heat and light source 101. A ratio of one part garlic oil concentrate to ten parts cooking oil instantly kills mosquitoes as they approach the heated lamp.

One skilled in the art would recognize that various embodiments of the present invention can be produced such as a solar powered lamp that charges a battery for nighttime lighting of an LED, incandescent, ultraviolet, or fluorescent bulb. Exterminating ingredients can be garlic oil, garlic paste, garlic emulsion, crushed fresh garlic, or other forms of natural killing compounds. Scent attractant may be added to any Allyl Sulfide emulsion or other natural killing compound.

Various embodiments of the present invention can be produced for outdoor free standing table lighting, stake lighting, post lighting, wall mounted lighting, hanging lighting or decorative lighting. Decorative lighting may comprise organic insect extermination lamp components embedded in a wine glass, margarita glass, vase, or other tableware or artistic motifs.

Figure 2:
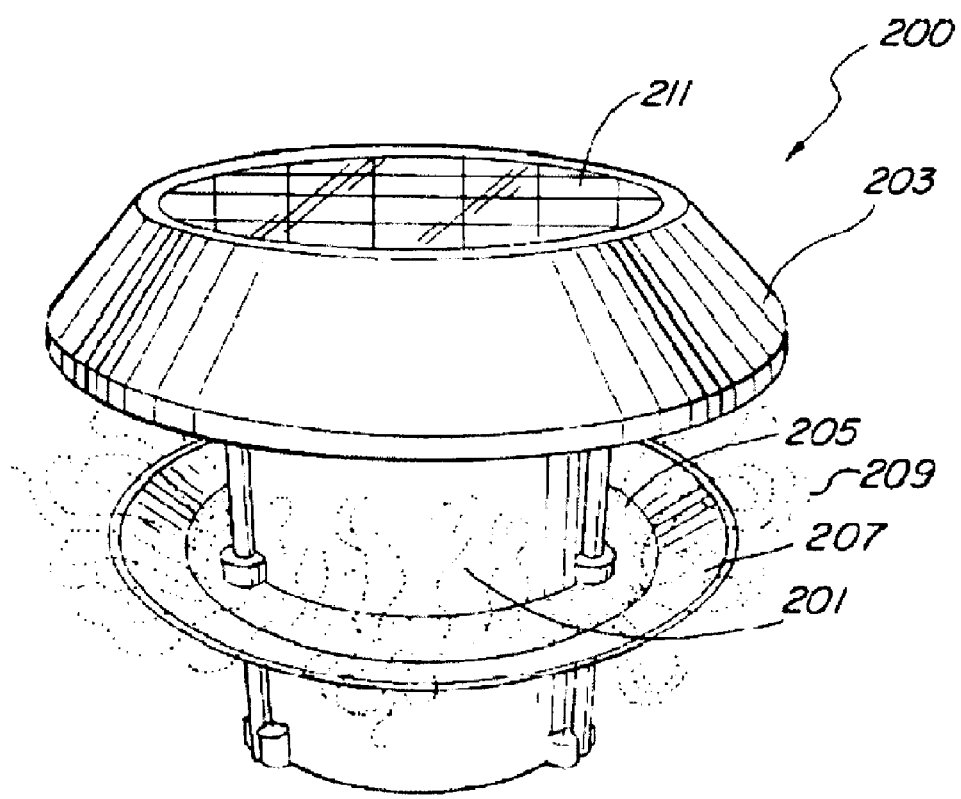
FIG. 2 illustrates a solar powered single open container LED lighted organic insect extermination lamp in accordance with one embodiment of the present invention.

FIG. 2 illustrates an exemplary embodiment of a solar powered single open container LED lighted organic insect extermination lamp. Lamp 200 comprises LED light source 201 housed in fixture 203 for vaporizing natural biting insect exterminating substance 205 from container 207. Alternately, container 207 may be located at the base of fixture 203. In another embodiment, lamp 200 comprises an additional container (not shown) located at the base of fixture 203. Natural exterminating substance 205 may comprise any Allyl Sulfide emulsion or other natural mosquito killing compound that produces exterminating vapors 209.

Fixture 203 comprises a solar cell 211 for supplying power to LED light source 201. LED light source 201 may be powered by AC or battery in addition to, or instead of, solar energy. In one embodiment, solar cell 211 charges batteries during daylight hours for lamp 200 use at night. In other embodiments, a user may charge rechargeable batteries with an AC source, plug in and operate directly with AC, or insert batteries for an evening of outdoor activity. Bright light from a single LED light source 201 powered by two AA rechargeable batteries provides sufficiently bright light for attracting mosquitoes such that heat as a by product of an incandescent light bulb is not necessary.

Figure 3:
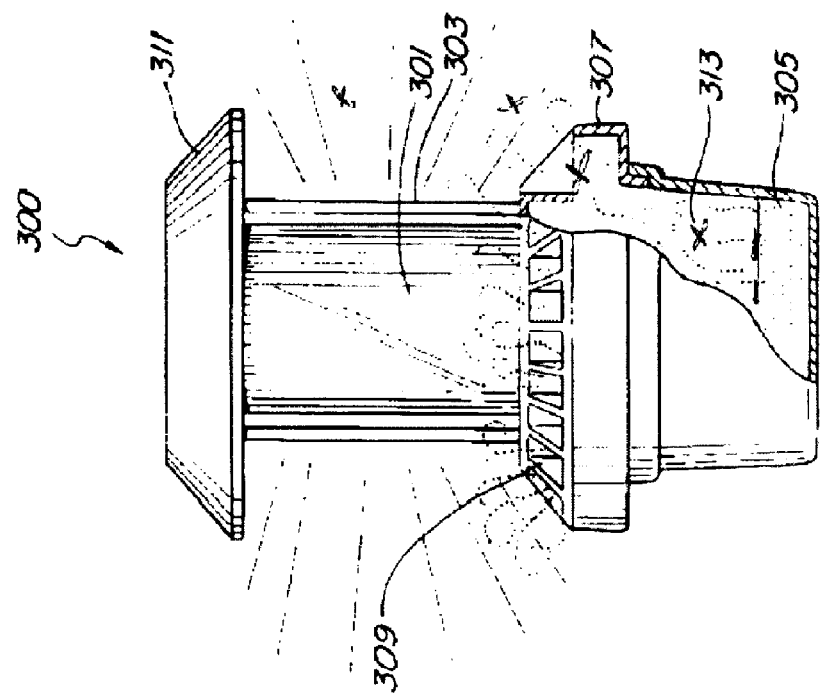
FIG. 3 illustrates a perspective view of a single vented container organic insect extermination lamp in accordance with one embodiment of the present invention.

FIG. 3 illustrates a perspective view of an exemplary embodiment of a single vented container organic insect extermination lamp. Lamp 300 comprises light and heat source 301 housed in fixture 303 for vaporizing natural biting insect exterminating substance 305 from vented container 307. Light and heat source 301 may comprise an AC powered incandescent bulb, fluorescent bulb, ultra violet bulb, LED or candle. Light and heat source 301 may be powered by any combination of solar energy, AC or battery. Natural exterminating substance 305 may comprise any Allyl Sulfide emulsion or other natural mosquito killing compound that produces exterminating vapors 309.

Mosquitoes and other biting insects are most active in their search for food during sunset and early evening hours. In one embodiment, where light source 301 is a LED, fixture 303 can comprise an additional heat source as an attractant during sunset and early evening hours. This additional heat source may comprise an unfired black ceramic fixture base that collects heat during the day, and emits its stored heat for approximately an hour as the sun sets. In another embodiment, a small battery operated incandescent bulb provides heat during sunset and early evening hours.

Fixture top 311 may distribute natural evaporative vapors 309 by providing a spinning fan moved by convection heat from light and heat source 301. A fan top embodiment comprises slots or vents at the bottom of fixture 303 to bring in-air, spin the air around the light and heat source 301, and then force the heated air out through the spinning top 311 in order to increase the distribution range of exterminating vapors 309. Alternately, the distribution range of exterminating vapors 309 may be increased by a means for moving air inside the light and heat housing of fixture 303.

Vented base container 307 comprises a slotted, vented, open weave, or perforated cover for facilitating evaporation of exterminating vapors 309 just below the lighted area and hiding any dead mosquitoes 313 that fall into exterminating solution 305 upon expiration. Vented base container 307 may snap or twist on and off for easy cleaning or adding extermination solution 305. Vented base container 307 may be a larger diameter than fixture top 311 for increasing the distribution range of exterminating vapors 309.

Figure 4:
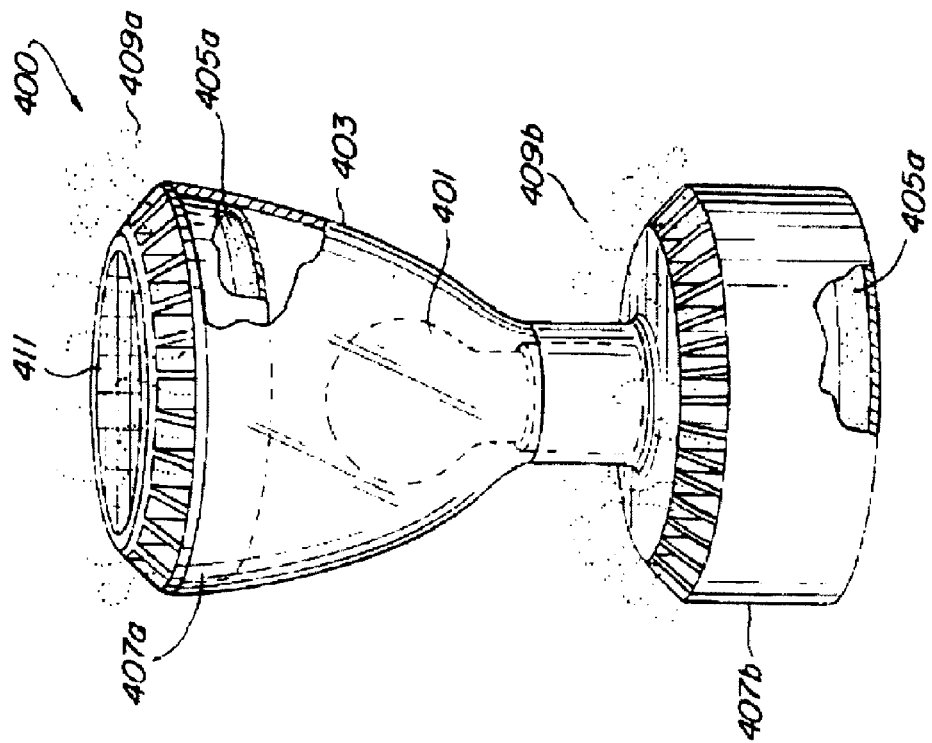
FIG. 4 illustrates a perspective cutaway view of a solar powered dual vented container organic insect extermination lamp in accordance with one embodiment of the present invention.

FIG. 4 illustrates a perspective cutaway view of an exemplary embodiment of a solar powered dual vented container organic insect extermination lamp. Lamp 400 comprises light and heat source 401 housed in fixture 403 for vaporizing natural exterminating substance 405a, 405b from vented containers 407a, 407b respectively. Light and heat source 401 may comprise an AC powered incandescent bulb, fluorescent bulb, ultra violet bulb, LED or candle. Light and heat source 401 may be powered by any combination of solar cell 411, AC or battery. Natural exterminating substance 405a,b may comprise any Allyl Sulfide emulsion or other natural mosquito killing compound that produces exterminating vapors 409a, 409b.

Dual container embodiment 400 advantageously traps mosquitoes between two fields of natural evaporative vapors 409a, 409b. Evaporation starts at bottom container 407b and flows upward, making contact with biting insects as they approach light and heat source 401. Mosquitoes approaching toward the top of lamp 400 make contact with natural evaporative vapors 409a from top container 407a. Mosquitoes approaching horizontally from the side of lamp 400 make contact with natural evaporative vapors 409b from bottom container 407b.

Under windy or breezy conditions, where wind or breeze blows upward around lamp 400, natural evaporative vapors 409b flow upward around lamp 400 from bottom container 407b. Where wind or breeze blows downward around lamp 400, natural evaporative vapors 409a flow downward around lamp 400 from top container 407a. Wind or breeze blowing horizontally causes bottom container 407b evaporative fumes 409b to flow upward.

Vented containers 407a,b provide ducts permitting wind or breeze to flow into one side of containers 407a,b and exit out through various vents expanding the distribution range of natural evaporative vapors 409a,b. Vented containers 407a,b create small jet stream effects causing evaporating vapors 409a,b to move in concentric circles away from lamp 400.

As natural extermination substance 405a held by top container 407a is heated by light and heat source 401 to a temperature in the range of 106-109 F, natural evaporative vapors 409a flow upward. Surrounding air heated by light and heat source 401 moving upward and heated air rising from top container 407a draw natural evaporative vapors 409b from bottom container 407b upward. Mosquitoes drawn into this evaporative convection meet immediate death and fall into bottom container 407b, which becomes a collection tray as well as a vessel for natural exterminating substance 405b. Bottom container 407b may be a larger diameter than top container 407a for increasing the distribution range of exterminating vapors 409a,b.

FIGS. 5-11 depict various views of a preferred organic extermination lamp. Most preferably, the organic extermination lamp includes a biphasic system, which permits the release of extermination fumes while isolating the naturally exterminating substance from direct contact, heat, and/or exposure.

Figure 5:
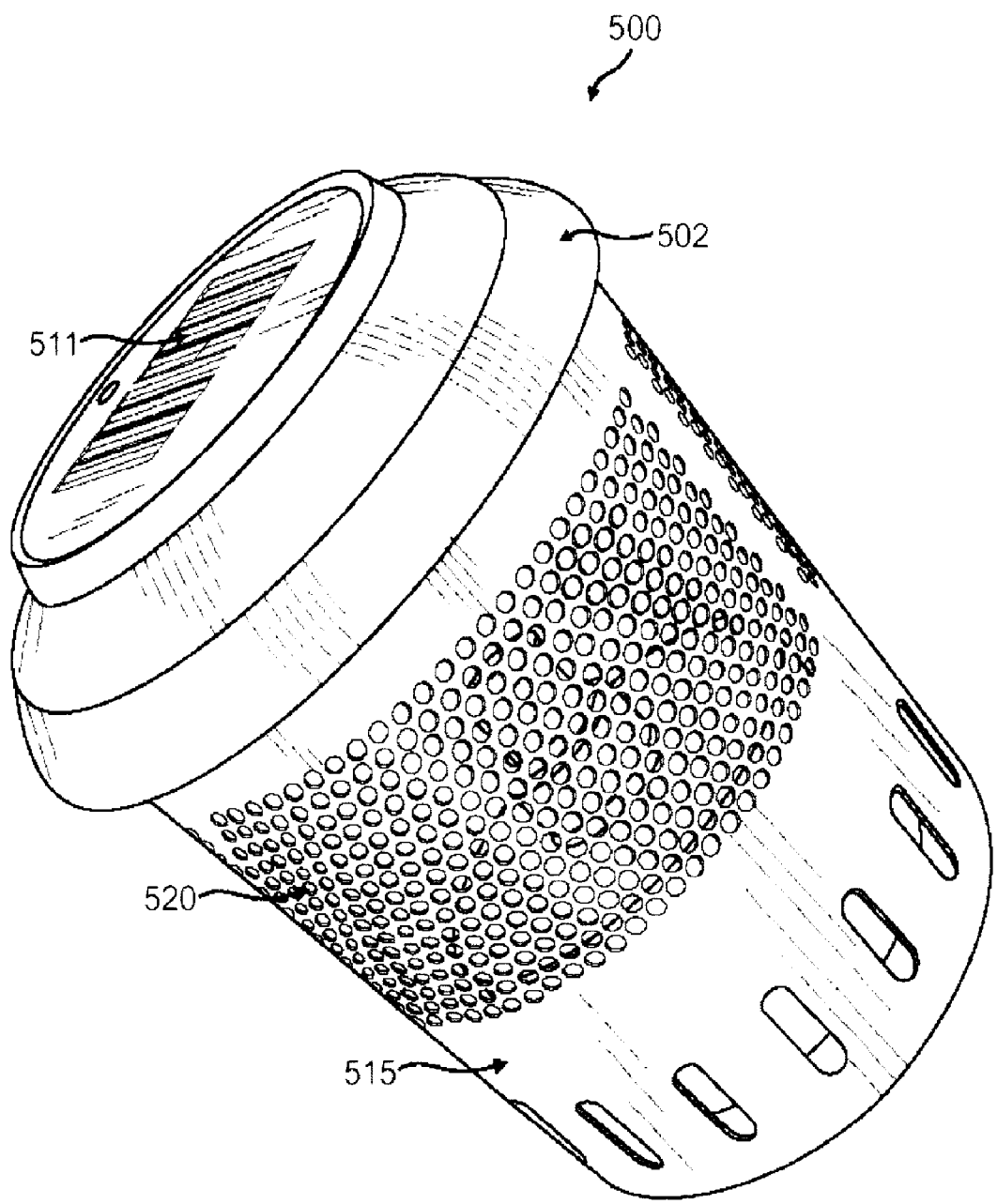
FIG. 5 illustrates an alternative preferred embodiment of an insect extermination lamp shown in a perspective view.
Figure 6:
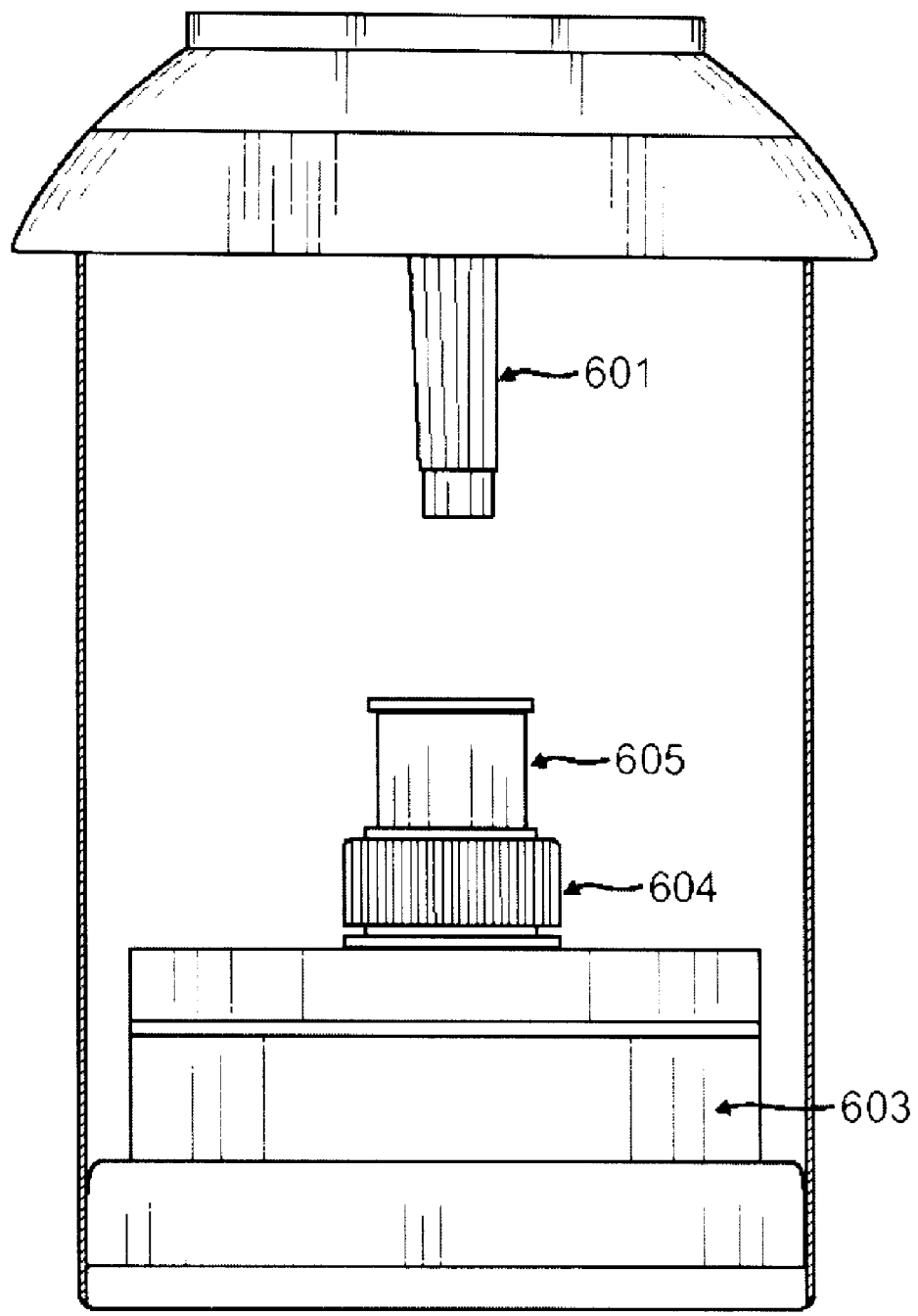
FIG. 6 illustrates a cutaway view of the organic insect extermination lamp shown in FIG. 5.

FIG. 5 illustrates a perspective view and FIG. 6 a cutaway view of the preferred organic insect extermination lamp. Referring to FIGS. 5 and 6, lamp assembly 500 includes a reversibly attachable fixture 502 and houses LED light source 601. The LED light source 601 is cool to the touch and thus emits very little heat. Thus, the LED light source 601 does not heat the substance to any appreciable degree. Lamp assembly 500 comprises a photovoltaic solar cell 511. During daylight hours the solar cell 511 charges two rechargeable batteries that provide power to the LED light source 601 after ambient light decreases.

Steel housing 515 includes perforations 520 to allow escape or diffusion of gases from decomposing biting insect exterminating substance. The perforations 520 also allow for air flow between the LED light source 601 and the reservoir 603. By utilizing the decomposition process rather than evaporation to produce the insect exterminating gases, this embodiment eliminates the need for a heat source to speed the production of the gases. Further, utilizing the decomposition process to produce the insect exterminating gases also allows for the use of solid material, such as crushed fresh garlic, as an insect extermination substance. Additionally, without an additional heat source the lamp operates at a lower temperature, providing increased safety and less risk of contact with hot surfaces.

Referring to FIG. 6, the cutaway view of the preferred embodiment, a reservoir 603 contains the natural insect exterminating substance. The interior of the reservoir can be accessed via the removable top 604. Closeable cap 605 can be opened, allowing gases produced by the exterminating substance to exit the reservoir 603. Afterwards, the closeable cap 605 can also be closed to prevent spillage of the exterminating substance during transit.

Most preferably, within the reservoir 603 is housed a biphasic system that selectively isolates solid organic matter, such as decomposing plant matter, from contact with the outer environment while permitting the release of extermination gases. In preferred embodiments, the biphasic system isolates or separates the exterminating substance from the atmosphere using differences in density. For example, an exterminating substance may be positioned in a lower (denser) layer than an upper (less dense) layer. In such a configuration, the upper layer prevents direct exposure of the exterminating substance to the outer environment but permits exterminating gasses to traverse and thus exit the reservoir 603 through the closable cap 605 when raised or opened.

The biphasic system may be particularly desired when using exterminating substances such as garlic, whole garlic, crushed garlic, garlic paste, or the like, which direct exposure to the outer environment would result in evaporation of the substance or components of the substance. By overlaying the exterminating substance with a less dense layer such as, for example, an oil, a cooking oil or the like, the insect exterminating substance is shielded from atmospheric gases, and thus not susceptible to evaporation, resulting in the decomposition process providing the insect exterminating gases.

Bright light from a single LED light source 601 powered by two AA rechargeable batteries provides sufficiently bright light for attracting mosquitoes such that heat as a by product of an incandescent light bulb is not necessary.

Figure 7:
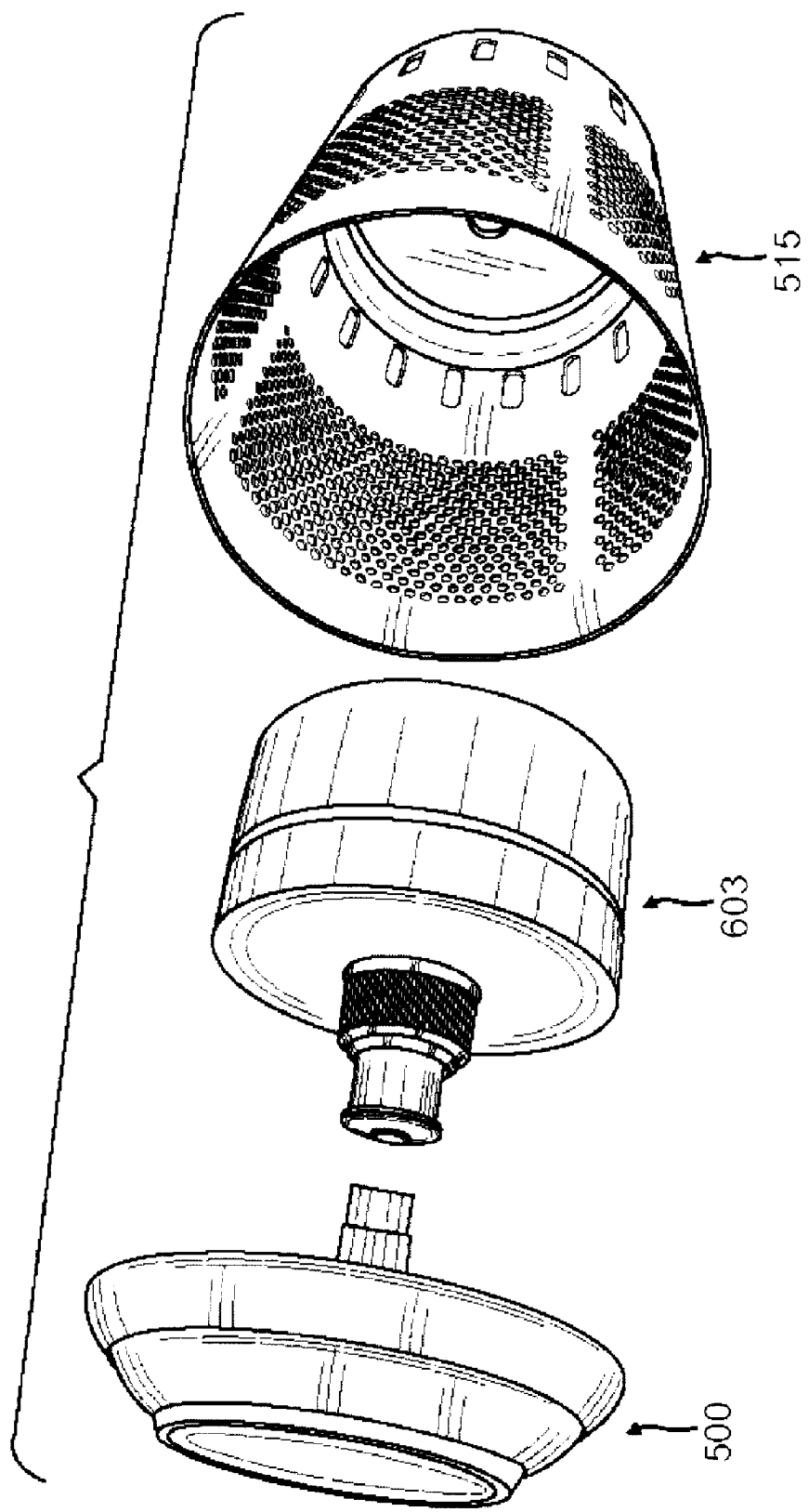
FIG. 7 illustrates an exploded view of organic insect extermination lamp shown in FIG. 5.

FIG. 7 shows an exploded view of the lamp. Lamp assembly 500 connects to housing 515, to which is reversibly attached reservoir 603. As such, the reservoir 603 may be removed or exchanged for a replacement reservoir 603, which may be provided separately. In this manner, different insect exterminating substances can be used with a single lamp, by replacing the reservoir 603 with one containing a different exterminating substance.

Figure 8:
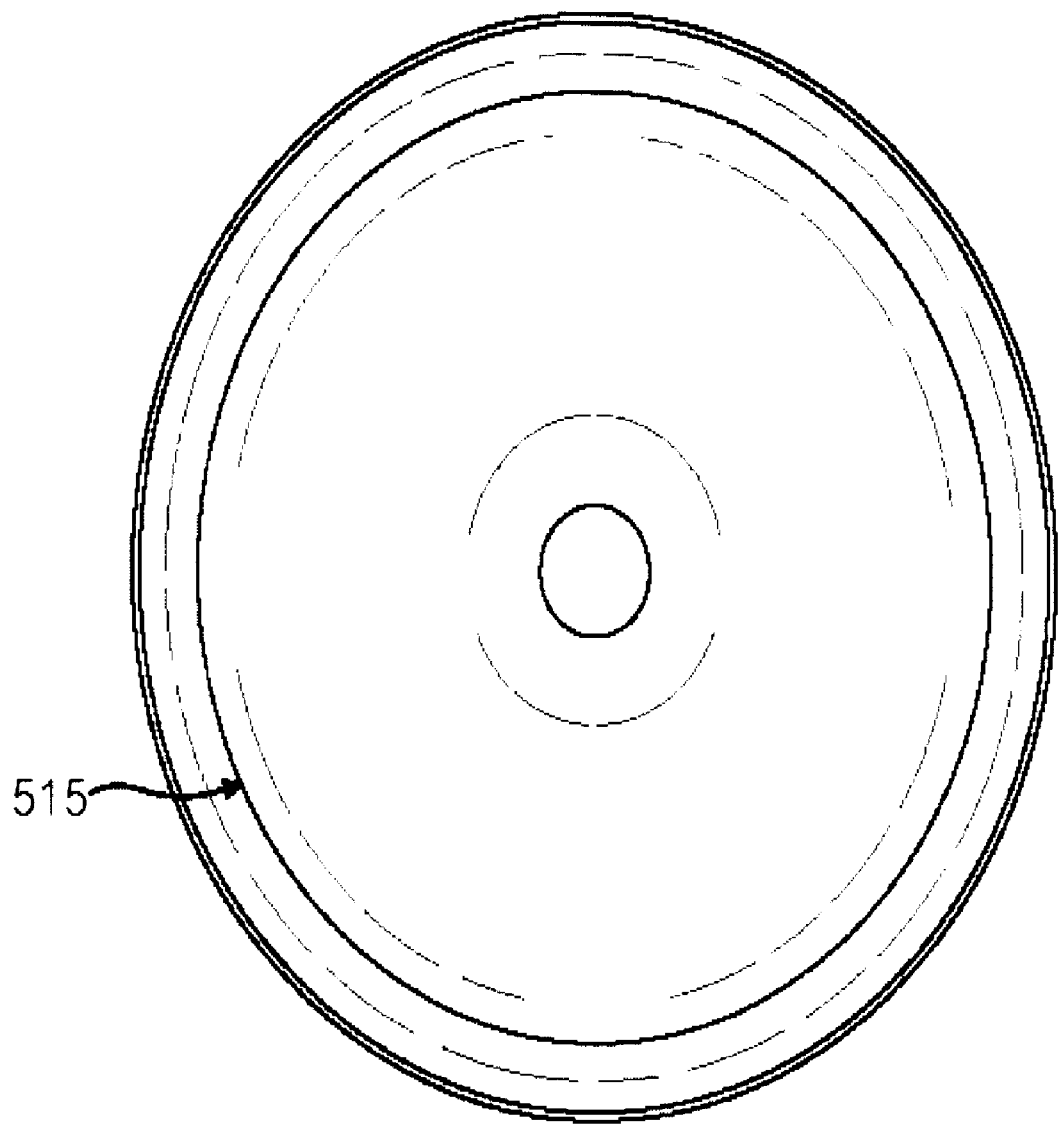
FIG. 8 is a bottom plan view of the organic insect extermination lamp shown in FIG. 5.

FIG. 8 shows a bottom plan view of the embodiment shown in FIG. 5, which provides the bottom of the housing 515.

Figure 9:
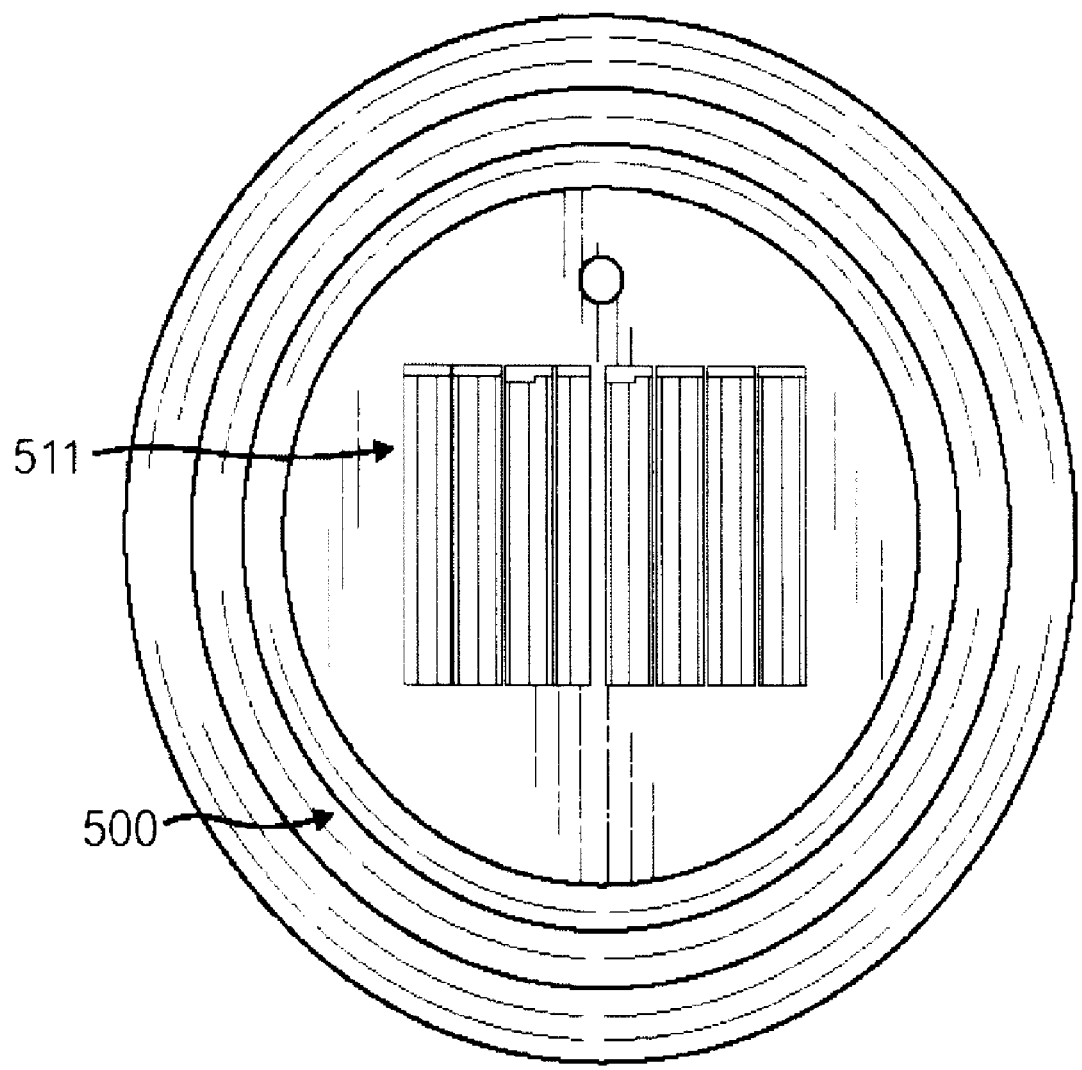
FIG. 9 is a top plan view of the organic insect extermination lamp shown in FIG. 5.

FIG. 9 shows a top plan view of the organic insect extermination lamp shown in FIG. 5. Lamp assembly 500 comprises a solar cell 511. During daylight hours the solar cell 511 charges two rechargeable batteries that provide power to the LED light source 610 when ambient light decreases.

Figure 10:
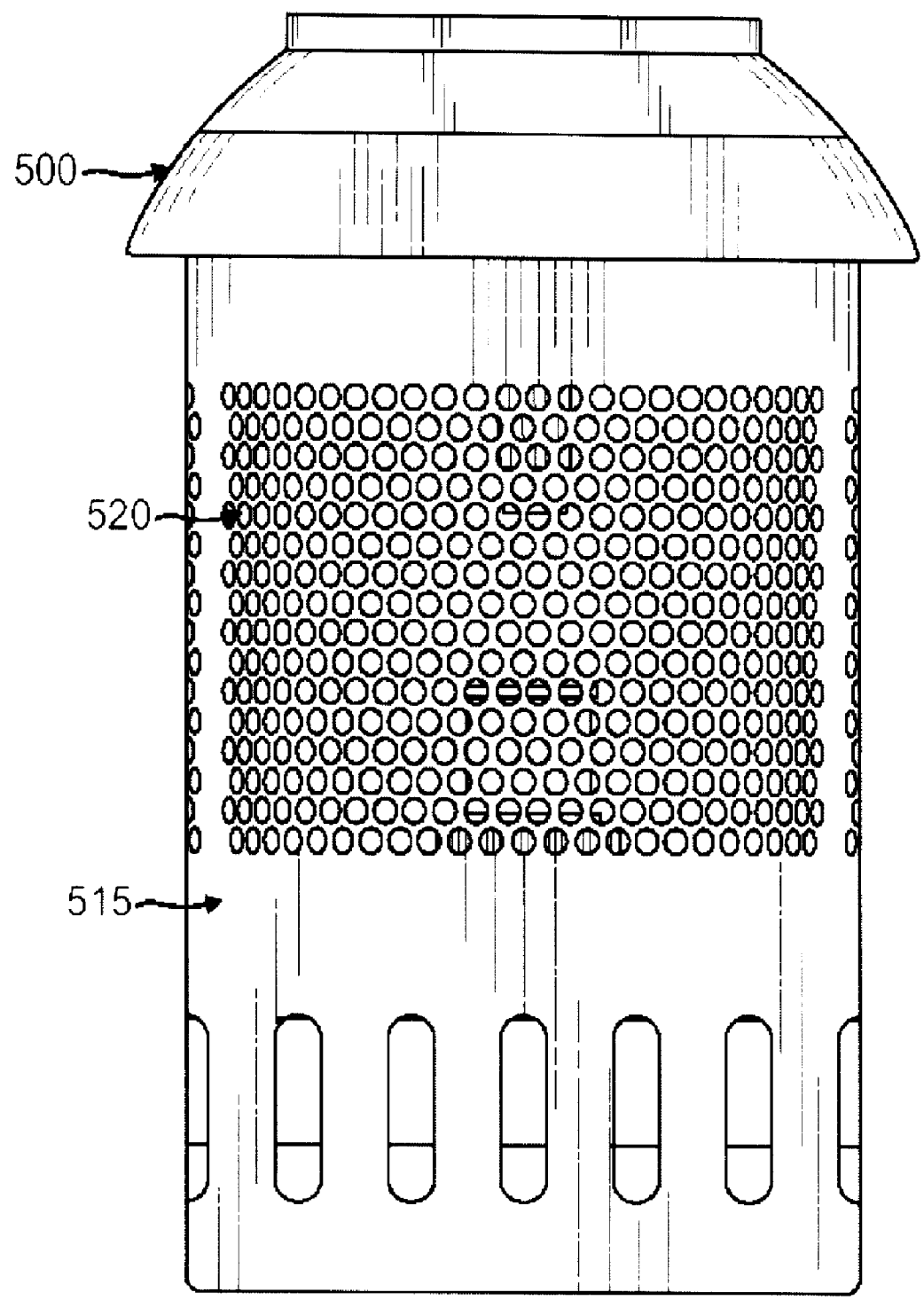
FIG. 10 is a front elevational view of the organic insect extermination lamp shown in FIG. 5, the rear view being a mirror image.
Figure 11:
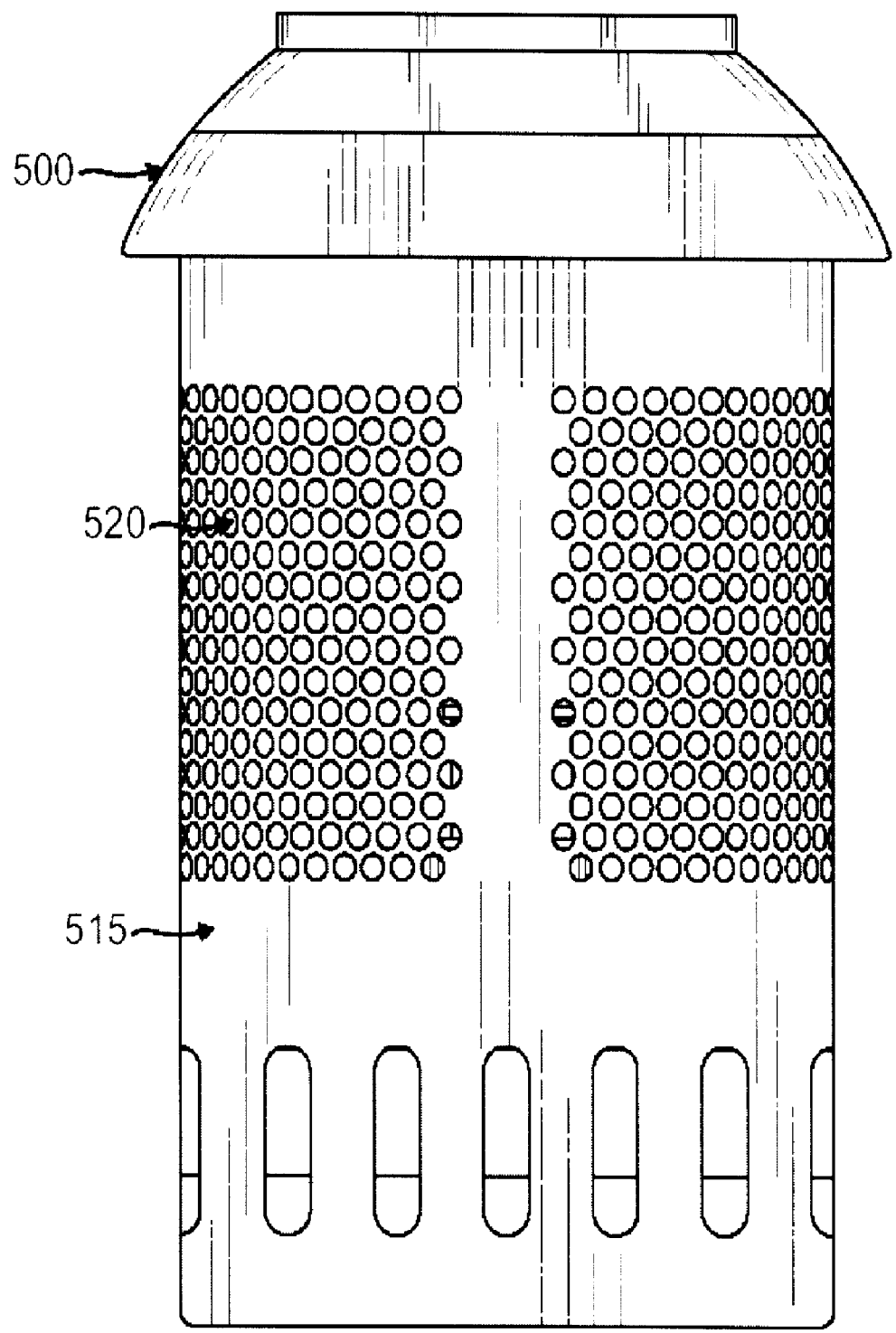
FIG. 11 is a side elevational view of the organic insect extermination lamp shown in FIG. 5, the opposing side view being a mirror image.

FIGS. 10 and 11 show front and side elevational views of the solar powered single open container LED lighted organic insect extermination lamp shown in FIG. 5; the back and opposing side views being mirror images. Lamp assembly 500 is attached to housing 515 which encloses reservoir 603. Perforations 520 allow for insect exterminating gases to flow from the reservoir 603 and surround the housing 515 as well as its vicinity.

Thus, a novel and improved method and apparatus for an organic insect extermination lamp have been described. The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Having described the invention in detail, it will be apparent that modifications, variations, and equivalent embodiments are possible without departing the scope of the invention defined in the appended claims. Furthermore, it should be appreciated that all examples in the present disclosure are provided as non-limiting examples.

What is claimed is:

1. An insect extermination lamp comprising:
   a) a housing comprising a plurality of perforations;
   b) a fixture comprising a power source and an LED light source for attracting mosquitoes and other biting insects without emitting substantial heat, wherein the LED light source is housed within the housing and light is emitted outward through the plurality of perforations;
   c) at least one covered reservoir having a closable cap for holding a natural exterminating substance; and
   d) a natural exterminating substance covered by an oil, wherein the natural exterminating substance is a solid that decomposes to produce natural exterminating fumes that are released through the oil for killing mosquitoes and other biting insects.

2. The insect extermination lamp of claim 1, wherein the power source comprises a photovoltaic power cell electrically coupled to at least one battery.

3. The insect extermination lamp of claim 1, wherein the natural exterminating substance comprises allyl sulfide.

4. The insect extermination lamp of claim 3, wherein the natural exterminating substance comprises garlic.

5. The insect extermination lamp of claim 4, wherein the natural exterminating substance comprises crushed garlic or garlic paste.

6. The insect extermination lamp of claim 1, wherein the LED light source is positioned above the least one covered reservoir.

7. The insect extermination lamp of claim 1, wherein the natural exterminating fumes are released through the plurality of perforations.

8. The insect extermination lamp of claim 1, wherein the housing is shaped entirely from an opaque material.

9. The insect extermination lamp of claim 1, wherein the plurality of perforations comprises apertures positioned around a perimeter or circumference of the housing.

* * * * *